INVENTOR
DANA W. MARTIN
BY
Harold W. Eaton
ATTORNEY

INVENTOR
DANA W. MARTIN
BY
Harold W. Eaton
ATTORNEY

United States Patent Office 2,887,828
Patented May 26, 1959

2,887,828
GRINDING MACHINE
Dana W. Martin, Northboro, Mass., assignor to Norton Company, Worcester, Mass., a corporation of Massachusetts Application September 6, 1956, Serial No. 608,265
11 Claims. (Cl. 51—86)

The invention relates to grinding machines and more particularly to a machine for simultaneously grinding partial external and internal cylindrical faces on the end of a work piece, such as, a jet motor blade.

One object of the invention is to provide a simple and thoroughly practical grinding machine for automatically grinding partial external cylindrical faces on one work piece and simultaneously grinding internal partial cylindrical faces on another work piece. Another object is to provide an indexable work supporting mechanism which is successively indexed from a loading to a grinding position. Another object is to provide a combined indexing mechanism for simultaneously supporting a plurality of work pieces combined with an oscillating mechanism for oscillating the work pieces relative to the operative faces of a plurality of grinding wheels to grind the surfaces to the desired and predetermined extent. Another object is to provide a work supporting mechanism including a Geneva-type mechanism for successively indexing the work support between a loading and a grinding position in which the Geneva mechanism is arranged for an oscillating motion to oscillate the portion of the work piece being ground relative to the grinding wheels to facilitate grinding partial cylindrical external and internal surfaces to the desired and predetermined extent. Other objects will be in part obvious or in part pointed out hereinafter.

A grinding machine has been illustrated in the drawings comprising a base 10 which serves as a support for a plurality of spaced angularly arranged grinding units 11, 12, and 13. The grinding units are adjustably supported on the base 10 so that they may be swiveled about the axis of the pivot studs 16, 16a, and 16b (Fig. 1) in a horizontal plane. The grinding units 11, 12, and 13 are identical in construction, consequently only one unit has been illustrated in detail, namely the grinding unit 11.

The grinding unit 11 consists of a grinding unit base 15 (Fig. 2) which is arranged to pivot about the pivot stud 16. In order to facilitate swiveling the base 15 in a horizontal plane, the base 15 is provided with a pair of spaced lugs 17 and 18. The machine base 10 is provided with an upwardly extending lug 19 which is positioned between the lugs 17 and 18. The lugs 17 and 18 are provided with adjusting screws 20 and 21 respectfully which are arranged to engage the opposite side faces of the lug 19. It will be readily apparent from the foregoing disclosure that by manipulation of the adjusting screws 20 and 21, the base 15 may be swiveled in a horizontal plane about the axis of the stud 16 to facilitate a precise angular adjustment of the grinding unit 11 when setting up the grinding machine. A pair of clamping blocks 22 and 23 (Fig. 2) are provided on the base 10 to facilitate clamping the unit base 15 in adjusted position thereon.

Figure 2:
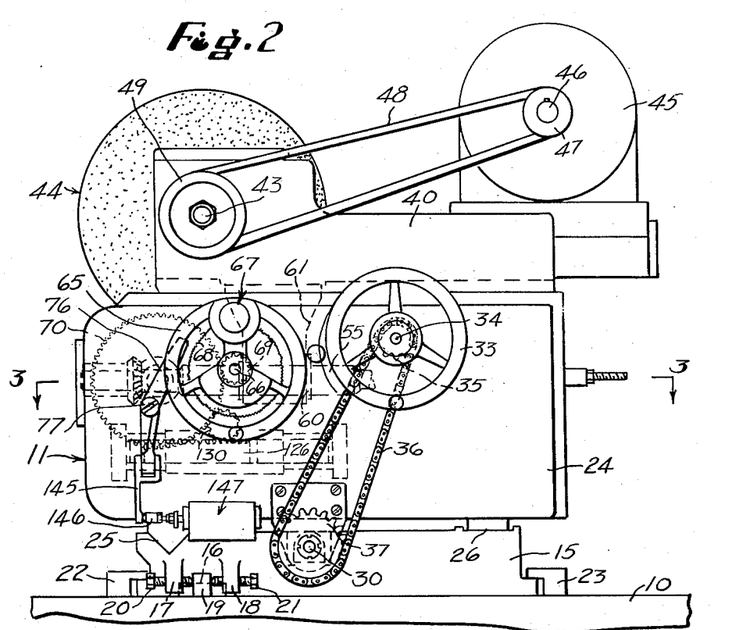
Fig. 2 is a side elevation, on an enlarged scale, of one of the grinding units.

The grinding unit base 15 serves as a support for a longitudinally movable carriage 24 (Fig. 2). The carriage 24 is arranged to slide longitudinally on a V-way 25 and a flat way 26 formed on the upper surface of the unit base 15.

Figure 4:
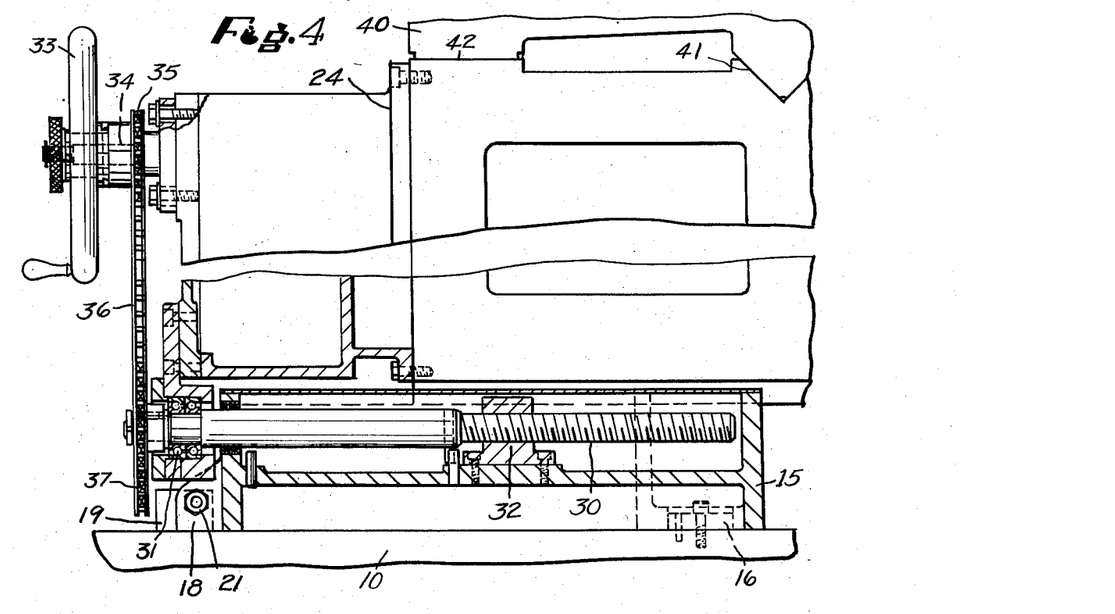
Fig. 4 is a fragmentary side elevation, on an enlarged scale, of the grinding unit having parts broken away and shown in section to illustrate the longitudinally traversing mechanism for the grinding machine.

A traversing mechanism is provided for imparting a longitudinally traversing movement to the carriage 24 comprising rotatable traversing screw 30, the left hand end of which is journaled in bearings 31 supported by the carriage 24. The traversing screw 30 meshes with or engages an upwardly projecting nut 32 which is fixedly mounted on the unit base 15 (Fig. 4). A manually operable traverse wheel 33 is rotatably supported on a shaft 34 which is fixedly mounted on the carriage 24. The traverse wheel 33 is operatively connected to rotate a sprocket 35 (Figs. 2 and 4) which is connected by a link chain 36 with a sprocket 37 mounted on the left hand end of the traversing screw 30 (Fig. 4).

Figure 1:
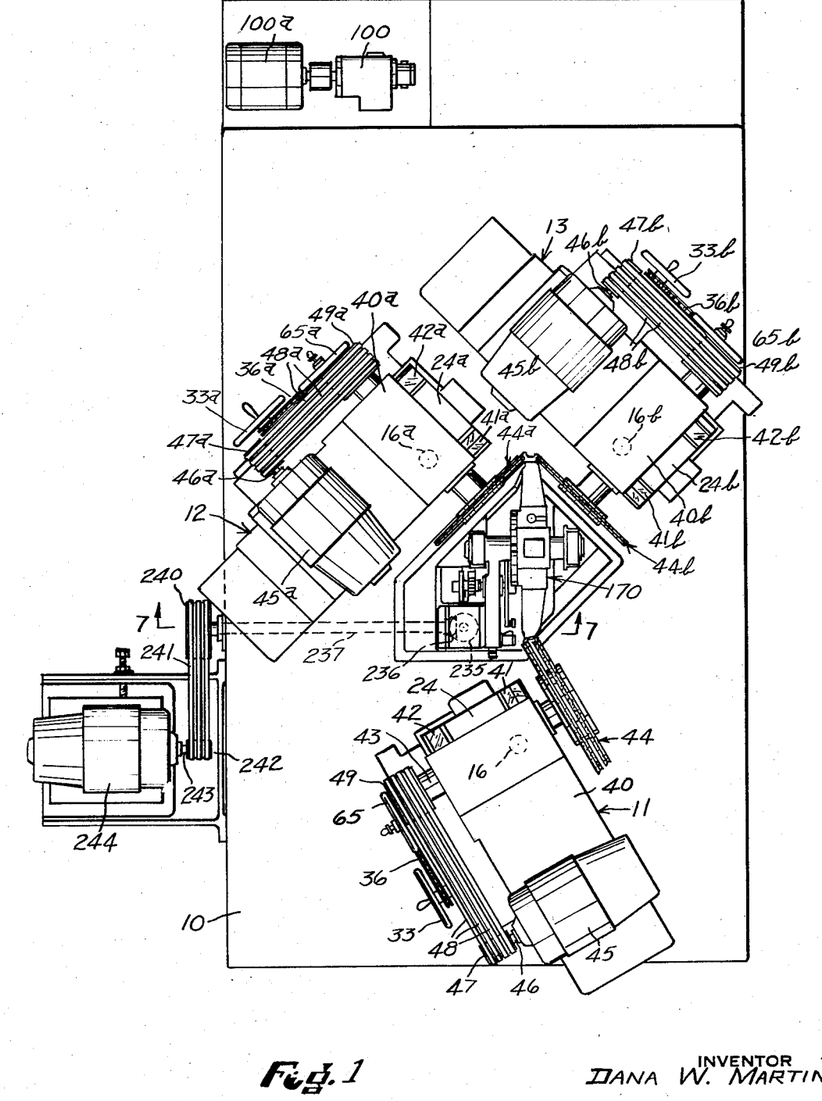
Fig. 1 is a plan view of the improved grinding machine.

The carriage 24 serves as a support for a wheel slide 40 which is arranged to move transversely relative to the carriage 24 on a V-way 41 and a flat way 42 formed on the upper surface thereof (Fig. 1). A wheel spindle 43 is journaled in suitable bearings (not shown) supported by the wheel slide 40. A grinding wheel 44, consisting of a pair of spaced grinding wheels, is mounted on the right hand end of the spindle 43 (Fig. 1). A driving mechanism is provided for the wheel spindle 43 and the grinding wheel 44 comprising an electric motor 45 (Figs. 1 and 2) which is mounted on the upper surface of the wheel slide 40. The motor 45 is provided with a motor shaft 46 having a multiple V-groove pulley 47 mounted on its left hand end which is connected by multiple V-belts 48 with a multiple V-groove pulley 49 mounted on the left hand end of the wheel spindle 43.

Figure 3:
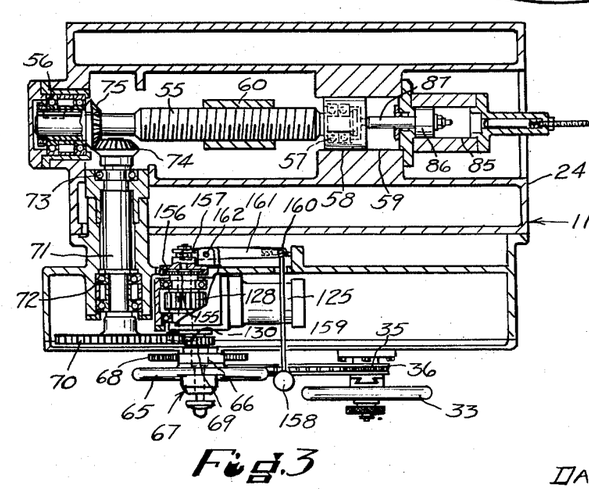
Fig. 3 is a horizontal sectional view, taken approximately on the line 3—3 of Fig. 2, showing the wheel feeding mechanism.

A feeding mechanism is provided for feeding the wheel slide 40 traversely relative to the carriage 24 comprising a rotatable feed screw 55. The left hand end of the feed screw 55 is journaled in a bearing 56 carried by the carriage 24. The right hand end of the feed screw 55 is journaled in bearings 57 (Fig. 3) supported with a slidably mounted sleeve 58. The sleeve 58 is arranged to slide in an axial direction within a cylindrical aperture 59 formed within the carriage 24. A feed nut 60 meshes with or engages the feed screw 55 and is supported by a bracket 61 depending from the underside of the wheel slide 40. A manually operable feed wheel 65 is rotatably supported on a shaft 66. The feed wheel 65 is provided with a conventional type micrometer adjusting mechanism 67 which connects the hand wheel 65 with a gear 68 rotatably mounted on the shaft 66. The shaft 66 is provided with a gear 69 which meshes with a gear 70 (Fig. 3) mounted on the lower end of a rotatable shaft 71, as shown in Fig. 3. The shaft 71 is journaled in spaced bearings 72 and 73 carried by the carriage 24. The upper end of the shaft 71, as shown in Fig. 3, is provided with a bevel gear 74 which meshes with a bevel gear 75 which is slidably keyed onto the feed screw shaft 55 (Fig. 3). A feed stop pawl 76 (Figs. 2 and 12) is pivotally supported by a stud 77 on the front of the carriage 24. The feed stop pawl is provided with a stop surface 78 which is arranged in the path of a stop abutment 79 carried by the micrometer adjusting mechanism 67. When the feed wheel 65 is rotated in a counter clockwise direction (Fig. 2) an infeeding movement is imparted to the wheel slide 40 and the grinding wheel 44. As the stop abutment 79 approaches the stop surface 78 on the pawl 76, a cam surface 80 on the micrometer adjusting mechanism 67 engages a cam surface 81 formed on the upper end of the pawl 76 (Fig. 12) to rock the pawl 76 in a counterclockwise direction in a manner to be hereinafter described.

A hydraulically operated mechanism is provided for imparting a rapid traverse positioning movement to the wheel slide 40 to move the grinding wheel 44 rapidly into operative engagement with the work piece to be ground. This mechanism comprises a cylinder 85 which is arranged in axial alignment with the feed screw 55. The cylinder 85 is fixedly supported on the carriage 24 (Fig. 3). The cylinder 85 contains a slidably mounted piston 86 which is connected to the right hand end of a piston rod 87. The left hand end of the piston rod 87 is connected to the slidably mounted sleeve 58.

When fluid under pressure is passed through a pipe 88 into a cylinder chamber 89 (Fig. 12), the piston 86 moves rapidly toward the left to cause a rapid positioning of the grinding wheel 44 relative to the work piece to be ground. During this movement, fluid within a cylinder chamber 90 may exhaust through a port 91 and a pipe 92 at a substantially unrestricted rate. Fluid within the cylinder chamber 90 may also exhaust through the port 93, through a throttle valve 94 into the pipe 92. It is desirable to slow down the rapid movement of the piston 86 as it approaches the left hand end of its stroke. This is accomplished by positioning the port 91 so that the piston 86 closes the port 91 before the piston reaches the end of its stroke so that thereafter fluid within the cylinder chamber 90 must exhaust through the port 93 and the throttle valve 94 into the pipe 92. The rate of cushioning or slowing down the rapid approaching movement of the piston 86 toward the left may be regulated by manipulation of the throttle valve 94. A ball check valve 95 is provided between the pipe 92 and the port 93 so that when the flow of fluid is reversed, fluid may pass substantially unrestricted from the pipe 92 into the cylinder chamber 90 to start a rapid rearward movement of the piston 86 to an inoperative position.

A fluid pressure system is provided for supplying fluid under pressure to the various actuating mechanisms of the machine. This system may comprise a fluid pump 100 (Figs. 1 and 12) which is driven by an electric motor 100a (Fig. 1). The pump 100 draws fluid through a pipe 101 from a reservoir 102 and passes fluid under pressure through a pipe 103 to the various actuating mechanisms of the machine. A relief valve 104 is connected with the pipe 103 to facilitate exhausting excess fluid under pressure directly through a pipe 105 into the reservoir 102 to facilitate maintaining a substantially constant operating pressure within the fluid pressure system.

Figure 12:
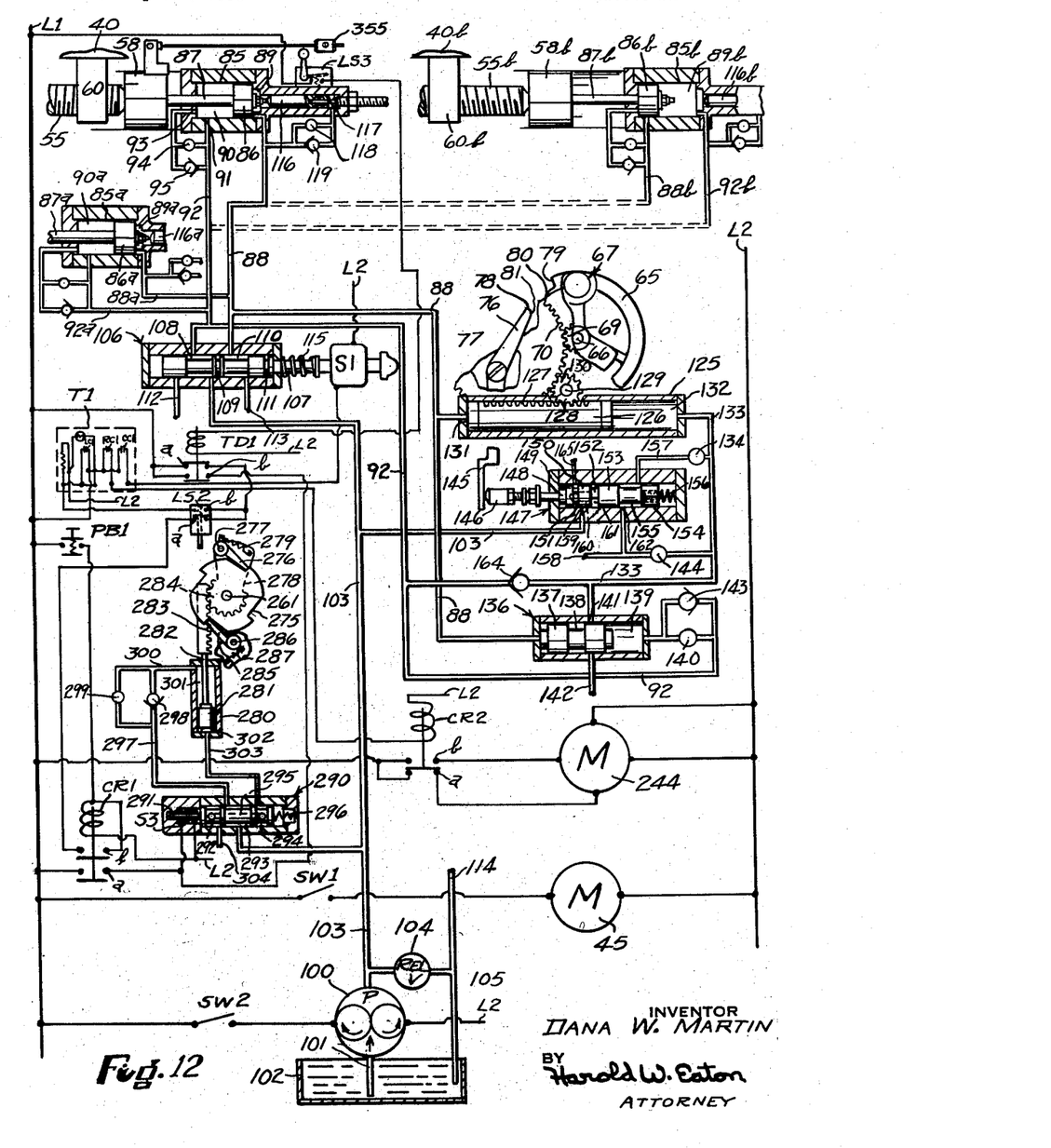
Fig. 12 is a combined electric and hydraulic diagram of the actuating mechanisms and the controls therefor.

A feed control valve 106 is provided for controlling the admission to and exhaust of fluid from the cylinder 85. The valve 106 is a piston type valve comprising a slidable valve member 107 having a plurality of spaced valve pistons formed integrally therewith to form a plurality of valve chambers 108, 109, 110 and 111. The valve 106 is provided with a pair of spaced exhaust pipes 112 and 113 which are connected to an exhaust pipe 114 to exhaust fluid into the reservoir 102. A compression spring 115 serves normally to hold the valve stem 107 in a right hand end position, as illustrated in Fig. 12. A solenoid S1 is provided which when energized serves to shift the valve stem 107 into a left hand end position to reverse the flow of fluid to the cylinder 85.

A dash pot mechanism is provided for cushioning the rapid rearward movement, that is, the movement of the piston 86 toward the right (Fig. 12). As the piston 86 approaches the right hand end of its stroke, it engages and moves a dash pot piston 116 toward the right. Fluid within a dash pot chamber 117 is exhausted at a rate controlled by a throttle valve 118 which determines the extent of cushioning, or slowing down the movement of the piston 86. It will be readily apparent from the foregoing disclosure that by manipulation of the throttle valve 118, the rate of cushioning may be varied as desired. A ball check valve 119 is connected between the pipe 88 and the dash pot chamber 117 so that when fluid under pressure is passed through the pipe 88 to initiate a movement of the piston 86 toward the left, fluid under pressure may also pass through the ball check valve 119 to fill the dash pot chamber 117 so that it is ready for the next grinding cycle.

A hydraulically operated mechanism is provided for rotating the feed screw 55 to impart a grinding feed to the wheel side 40 and the grinding wheel 44. This mechanism comprises a cylinder 125 (Figs. 3 and 12) which contains a slidably mounted piston 126. The upper surface of the piston 126 is provided with rack teeth 127 which mesh with a gear 128 which is fixedly mounted on a rotatable shaft 129. A gear 130 is mounted on the shaft 129 and meshes with the gear 70. It will be readily apparent from the foregoing disclosure that movement of the piston 126 toward the right will be transmitted through the gear mechanism above described to impart a grinding feed to the wheel slide 40 and the grinding wheel 44. When fluid under pressure is passed through the pipe 88 into a cylinder chamber 131 toward the left hand end of the cylinder 125, the piston 126 starts moving toward the right. During this movement of the piston 126, fluid within a cylinder chamber 132 exhausts through a pipe 133 and through a throttle valve 134 and a throttle valve 144 and exhausts into the reservoir 102. The rate of exhaust of fluid from the cylinder chamber 132 is governed by the throttle valves 134 and 144. It is desirable to provide a grinding feed at an initial rate which is thereafter reduced as the work piece approaches finished size. During the initial grinding feed the throttle valves 134 and 144 both determine the rate of feed.

During the initial movement of the piston 126 it is desirable to allow the piston 126 to move at a rapid rate to take up the backlash in the parts of the feeding mechanism. When pressure is passed through the pipe 88 to initiate a grinding feed, fluid under pressure is passed onto a left hand end chamber of a backlash control valve 136. The backlash control valve 136 is a shuttle-type valve comprising a slidably mounted valve member 137 having a pair of spaced integrally valve pistons which form a valve chamber 138. Movement of the valve member 137 toward the right is controlled by fluid exhausting from the end chamber 139 through a throttle valve 140 into the pipe 92. During movement of the valve member 137 toward the right, the valve chamber 138 opens a port 141 so that fluid may exhaust substantially unrestricted from the cylinder chamber 132 and pass through an exhaust pipe 142 into the reservoir 102. It will be readily apparent from the foregoing disclosure that the rate of movement of the backlash valve member 137 across the port 141 determines the amount of fluid that may be metered from the cylinder chamber 132 thereby determining the extent of rapid movement of the piston 136 in taking up backlash in the feed mechanism parts. A ball check valve 143 is provided in the pipe 92 so that when fluid under pressure is reversed and passed through the pipe 92 it may pass substantially unrestricted into the valve chamber 139 rapidly to move the valve member 137 toward the left into a reset position.

A suitable mechanism is provided for rendering the throttle valve 134 inoperative during the finish grinding operation so as to provide a fine grinding feed wheel to size the work piece being ground. The feed stop pawl 76 is provided with a downwardly extending arm 145 which is arranged to engage a stem 146 of a control valve 147. The control valve 147 is a piston type valve in which the valve stem 146 is connected to a slidably mounted valve member 148 having a pair of spaced valve pistons 149 and 150 forming a valve chamber 151 therebetween. The valve 147 contains an independent slidably mounted valve member 152 having a pair of spaced integrally valve pistons 153 and 154 forming a valve chamber 155 therebetween. A compression spring 156 serves normally to hold the valve members 148 and 152 in a left hand end position, as illustrated in Fig. 12. In this position of the valve 147 fluid exhausting through the throttle valve 134 passes through a pipe 157 into the valve chamber 155 and through an exhaust pipe 158 into the reservoir 102.

When the work piece being ground approaches finished size, the cam 80 carried by the feed wheel 65 moving in a counter clockwise direction engages the cam 81 on the pawl 76 and rocks the pawl 76 together with the arm 145 in a counter clockwise direction to move the valve stem 146 toward the right through a short distance (Fig. 12). During the movement of the valve stem 146 toward the right, the valve chamber 151 uncovers a port 159 so that fluid from the pipe 103 passes into the valve chamber 151 and passes through a passage 160 into a valve chamber 161 to rapidly move the slidably mounted valve member 152 toward the right. During the rapid movement of the valve member 152 toward the right, the valve piston 153 closes a port 162 to cut off exhaust of fluid from the valve chamber 155 thereby rendering the throttle valve 134 ineffective. With the parts in this position fluid exhausting from the feed cylinder chamber 132 thereafter exhausts through the throttle valve 144 which is adjusted to produce a predetermined slow final grinding feed to the grinding wheel 45 for a short interval of time before the stop abutment 79 engages the stop surface 78 to positively stop the infeeding movement of the grinding wheel 45.

When fluid under pressure is passed through the pipe 92, after a grinding operation has been completed, it passes through a ball check valve 164 and through the pipe 133 into the cylinder chamber 132 to move the feed piston 126 toward the left to reset the feed mechanism for the next feeding cycle. During this movement the feed wheel 65 rotates in a clockwise direction thereby withdrawing the abutment 79 from engagement with the pawl 78 and moving the cam 80 out of engagement with the cam 81. At this time released compression of the spring 156 pressure within shifts the slidably mounted valve members 151 and 152 toward the left to close the port 159 and to open a port so that fluid confined within the valve chamber 161 may exhaust through the passage 160 into the valve chamber 151 and exhausts through a pipe 165. The release compression of the spring 156 then shifts the valve member 152 toward the left thereby opening the port 162 so that the throttle valve 134 is rendered operative for the next infeeding cycle.

The feed mechanism above described is provided with a clutch mechanism so that the feed wheel 65 may be rotated manually, if desired, without the necessity of overcoming fluid pressure within the feed cylinder 125. This clutch mechanism and the feed mechanism above described, with the exception of the valve 147, is substantially identical with that shown in the prior U.S. patent to H. A. Silven No. 2,572,529, dated October 23, 1951, to which reference may be had for details of disclosure not contained herein. The gear 128 is free to rotate relative to the shaft 129. An external gear 155 is fixedly mounted to rotate with the gear 128 and serves as one element of the clutch. The second element of the clutch is an internal gear 156 (Fig. 3) which is keyed to the shaft 129. A spool shaped member 157 is formed integrally with the internal gear 156 and is arranged to slide in an axial direction relative on the shaft 129 into or out of mesh with the external gear 155.

A manually operable mechanism is provided for actuating the clutch comprising an actuating knob 158 which projects from the front of the machine face. The knob 158 is mounted on a slide rod 159 which is connected by a stud 160 with the right hand end of a rock arm 161. The rock arm 161 is pivotally supported on a stud 162. The left hand end of the rock arm 161 is provided with a yoke-shaped portion having pins which ride within the groove formed on the spool shaped member 157. When it is desired to declutch the gear 128 to facilitate manual operation of the feed wheel 65, the knob 158 is pulled in a downward direction (Fig. 3) to rock the arm 161 and thereby to slide the internal gear 156 out of mesh with the external gear 155. In this position of the parts, the feed wheel 65 may be freely rotated to adjust the position of the wheel slide 40 and the grinding wheel 44.

The grinding units 12 and 13 are substantially identical with the grinding unit 11 and consequently have not been shown in detail. The parts of grinding units 12 and 13 illustrated in Fig. 1 bear the same reference numerals to designate corresponding parts with the suffix "a" applied to the numerals of grinding unit 12 and the suffix "b" apply to the numerals of grinding unit 13. Each of these grinding units is provided with a feeding mechanism identical with that shown and described in connection with the grinding unit 11.

Each of the hydraulic feeding mechanisms for the grinding units 11, 12, and 13 are identical with that shown and described in connection with the grinding unit 11 with the exception of the piping to the rapid feed cylinder 85b (Fig. 12). The feeding movement of the wheel slide 40b of the grinding unit 13 is in an upward direction toward the left (Fig. 1). In order to obtain an infeed of the wheel slide 40b fluid under pressure is passed through the pipe 88b to impart a movement of the piston 86b toward the right so as to cause a rapid approaching movement of the wheel slide 40b rapidly to position the grinding wheel 44b into operative position relative to the work piece being ground. During this movement fluid exhausting from the cylinder chamber 89b exhausts through the pipe 92b. In this modified operation, the dash pot piston 116b serves to slow down and cushion the rapid approaching movement of the grinding wheel 44b. The infeeding movement of the wheel slides 40a and 40b of the grinding units 12 and 13 respectively are each controlled by an independent feed control valve 106 identical with that just described. The feed control valves 106 of each grinding unit are simultaneously actuated by an electrical control mechanism to be hereinafter described.

The rapid feed mechanism for the grinding units 12 and 13 is identical with that shown and described in connection with unit 11 and therefore has been shown only diagrammatically in Fig. 12. These mechanisms comprise cylinders 85a and 85b which contain slidable pistons 86a and 86b, respectively, connected to piston rods 87a and 87b. Two pairs of pipes 88a and 92a and 88b and 92b are connected between the cylinder 85a and 85b, respectively, and the pipes 88 and 92.

As illustrated in Fig. 12, a single feed control valve 106 is provided for simultaneously controlling the admission to and exhaust of fluid from the rapid feed cylinders 85, 85a, and 85b. If desired a separate feed control valve 106 may be provided for each of the grinding units 11, 12, and 13. A single feed cylinder 125 has been diagrammatically shown in Fig. 12. In actual construction, an identical independent feed mechanism may be provided for each grinding unit.

Figures 5, 13:
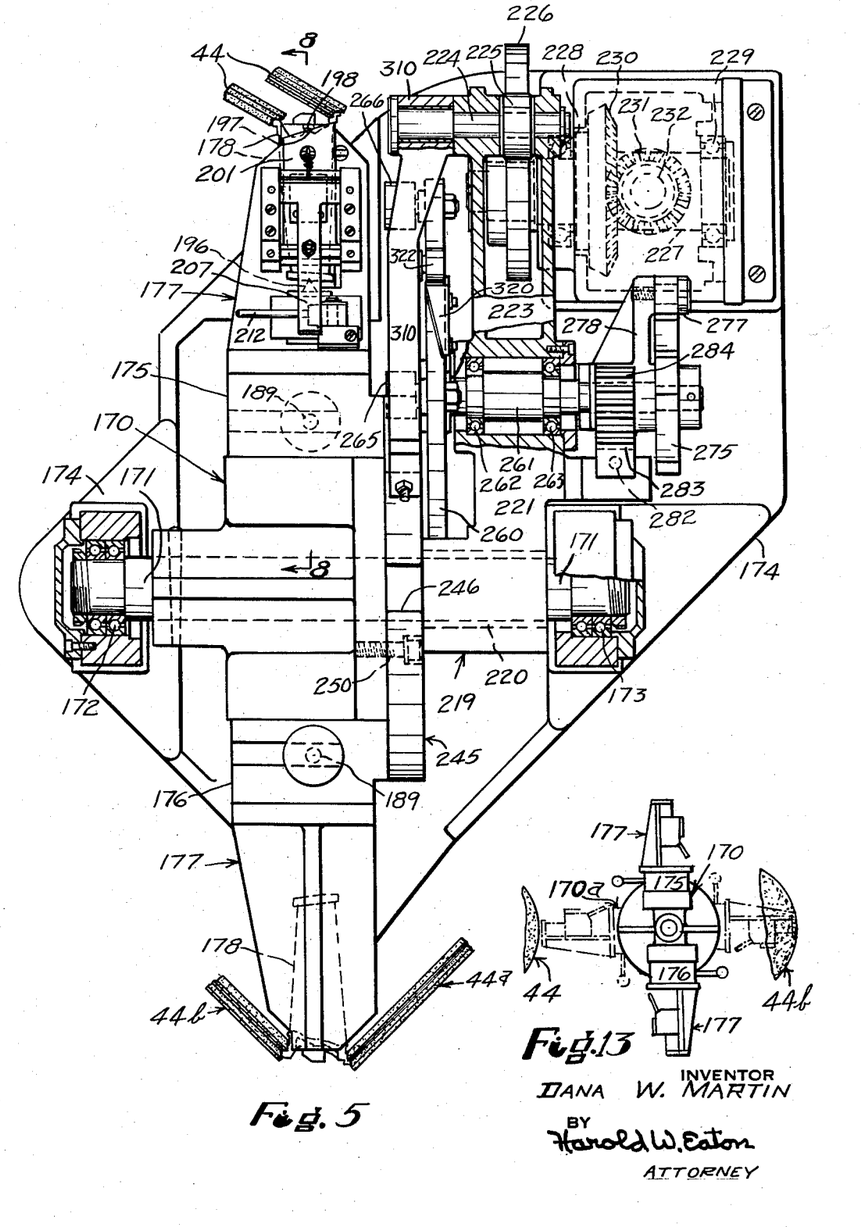
Fig. 5 is a fragmentary plan view, on an enlarged scale of the work support indexing and oscillating mechanism.
Fig. 13 is a diagrammatic view showing the indexable work supporting mechanism.

A work supporting mechanism is provided for supporting a plurality of work pieces for simultaneously grinding internal and external surfaces on the ends thereof. This mechanism comprises an oscillatable and indexable work supporting member 170 (Fig. 5) which is fixedly supported on a shaft 171 which is journaled in a pair of spaced anti-friction bearings 172 and 173. The bearings 172 and 173 are supported by a work supporting base 174 (Figs. 5 and 6). The work supporting member 170 is arranged so that it may be oscillated to perform the desired grinding operation and may be indexed in a manner to be hereinafter described to facilitate loading and unloading work pieces. The member 170 is provided with a pair of diametrically opposed arms 175 and 176 which serve as supports for detachable work holder units 177. The work holder units 177 are arranged to support jet motor blades 178 for grinding end surfaces thereon. The grinding wheel 44 is shown as a pair of spaced grinding wheels which are shaped to grind partial external cylindrical faces 178a, 178b, 178c, 178d, and 178e (Fig. 11) during oscillation of the work supporting member 170 while the grinding wheel slide 40 is fed transversely. Similarly the grinding wheel 44a is shaped to grind partial cylindrical internal surfaces 178j, 178k, and 178m during oscillation of the work supporting member 170 as the wheel slide 40a is fed transversely. At the same time the grinding wheel 44b is shaped to grind internal surfaces 178f, 178g, and 178h during a simultaneous transverse feeding movement of the wheel slide 40b. It will be readily apparent from the showing in Fig. 1 that an external grinding operation is performed on the work supporting arm 175 (Fig. 5) and at the same time an internal grinding operation is performed on the surfaces above mentioned while supported on the arm 176. The external and internal operations being simultaneously performed during oscillation of the work supporting member 170.

Figures 8, 9, 10, 11:
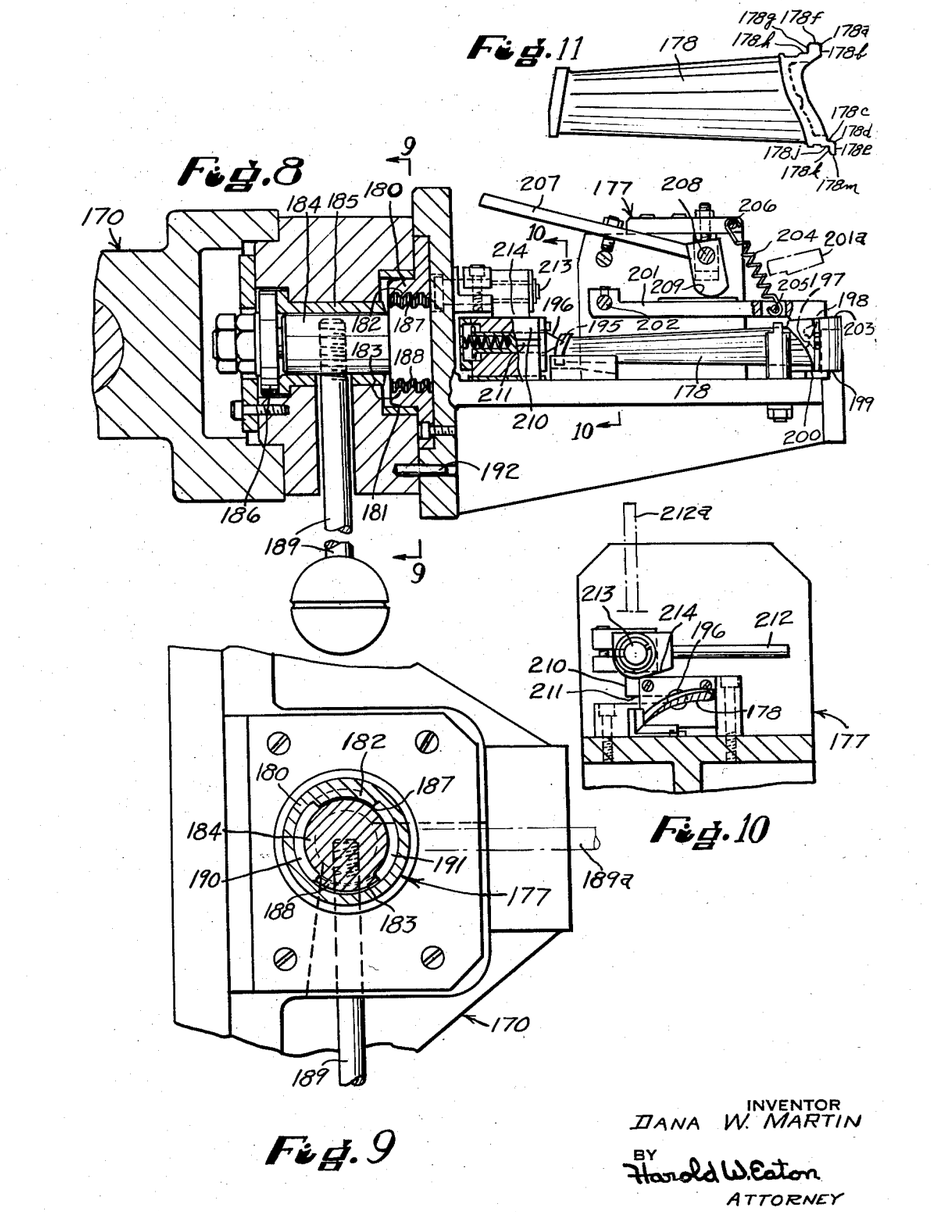
Fig. 8 is a fragmentary sectional view, on an enlarged scale, taken approximately on the line 8—8 of Fig. 5 through one of the work holders.
Fig. 9 is a sectional view taken approximately on the line 9—9 of Fig. 8, through the work holder.
Fig. 10 is a cross sectional view, taken approximately on the line 10—10 of Fig. 8.
Fig. 11 is a plan view of a work piece.

The work holders 177 are detachably supported on the arms 175 and 176 so that they may be readily removed and loaded at a bench while other work holders supporting work pieces are in position for a grinding operation. The work holder 177 is provided with a flanged bushing 180 which fits within a cylindrical aperture 181 formed in the arms 175 and 176. A quarter-type screw lock, which resembles the bridgelock on a gun, is provided for rapidly securing the work holder 177 in position. The bushing 180 is provided with diametrically opposed partial internal threads 182 and 183. A rotatable stud 184 is supported by a bushing 185 and is provided with an enlarged collar 186 which serves as an end thrust member. The stud 184 is similarly provided externally threaded portions 187 and 188 which are arranged to mate with the internally threaded portions 182 and 183 of the bushing 180. An actuating arm 189 is fixedly mounted in the stud 184 and is arranged to swing in a counter clockwise direction through approximately 90° from the full line position (Fig. 9) into the broken line position 189a when it is desired to release the holder 177 from either the arm 175 or the arm 176 after a grinding operation has been completed. When the arm 189 is swung to the position 189a, the externally threaded portion 187 and 188 of the stud 184 swing out of mesh with the internally threaded portions 182 and 183 of the bushing 180 so that the externally threaded portions 187 and 188 of the stud 184 are in line with the clearance apertures 190 and 191 formed in the bushing 180 so that the work holder 177 may be readily removed by moving it toward the right (Fig. 8). A locating pin 192 is provided on the end of the arms 175 and 176 which mates with a locating hole formed within the work holder 177. It will be readily apparent from the foregoing disclosure that after a work piece 178 has been ground to the desired extent and the work supporting member 170 is indexed to a loading position as will be hereinafter described, the work holder 177 may be readily unclamped and removed and replaced by another work holder which has been previously loaded for a grinding operation. By providing a plurality of work holders 177, the spare work holders may be loaded at a bench so that they may be quickly and readily inserted into the machine.

A work piece, such as, a jet motor blade 178 is placed in the work holder with a center hole 195 formed in the left hand end of the blade 178 in an engagement with a conically-shaped spring pressed center 196 carried by a holder 177 (Fig. 8). A locating projection 197 on the right hand end of the blade 178 is swung into position in an engagement with a locating stud 198 carried by the holder 177. The under side of the blade is provided with a surface 199 which engages a plane surface 200 formed on the work holder 177. After the blade 178 is in the position illustrated in Fig. 8, a pivotally mounted clamping arm 201 which is pivoted on a stud 202 is swung in a clockwise direction so that its right hand end portion (Fig. 8) engages a surface 203 on the blade 178. A tension spring 204 is connected between a stud 205 on the arm 201 and a stud 206 which is fixedly mounted on the holder 177. The spring 204 normally tends to exert a tension on the clamping arm 201 in a counter clockwise direction.

An actuating mechanism is provided for actuating the clamping arm 201 comprising a lever 207 which is pivotally mounted on a rock shaft 208. A cam 209 is fixedly mounted to move with the lever 207. When it is desired to clamp a blade 178 on the holder 177, the arm 207 is swung in a counter clockwise direciton into the full line position 207 (Fig. 8). During this movement, the cam 209 moves in a counter clockwise direction to swing the clamping arm 201 in a clockwise direction from the broken line position 201a into the full line position 201 to clamp a blade 178 to be ground in a predetermined position on the holder 177. A loaded work holder 177 may readily be inserted in the position on either the arm 175 or the arm 176 of the work supporting member 170 and quickly clamped in a predetermined position thereon by actuation of the arm 189.

The spring-pressed center 196 in the work holder 177 (Fig. 8) is arranged so that when the blade to be ground is inserted in the holder, the center 196 yields in a direction toward the left while swinging the projection 197 into engagement with the stud 198. It is desirable to clamp the spring-pressed center 196 in a position during the grinding operation. The block 210 which supports the center 196 on the work holder 177 is provided with a longitudinally extending slot 211. A clamping arm 212 (Fig. 10) is supported by a rock shaft 213. A cam 214 actuated by the arm 212 swings into engagement with the upper surface of the block 210 when the arm 212 is moved from a broken line position 212a in a clockwise direction into the full line position 212. During this movement the cam 214 exerts a downward pressure on the upper surface of the block 210 to clamp the center 196 in an operative position so as to hold it in endwise movement during the grinding operation.

A mechanism for oscillating and indexing the work supporting member 170 is supported on a 3-legged arm 219 (Fig. 6) which is pivotally supported by a bearing 220 (Fig. 5) on the shaft 171. The 3-legged arm 219 is provided with a downwardly extending angularly arranged arm 222 which is provided with an integral vertical extending arm 221 and a horizontally extending arm 223.

Figure 6:
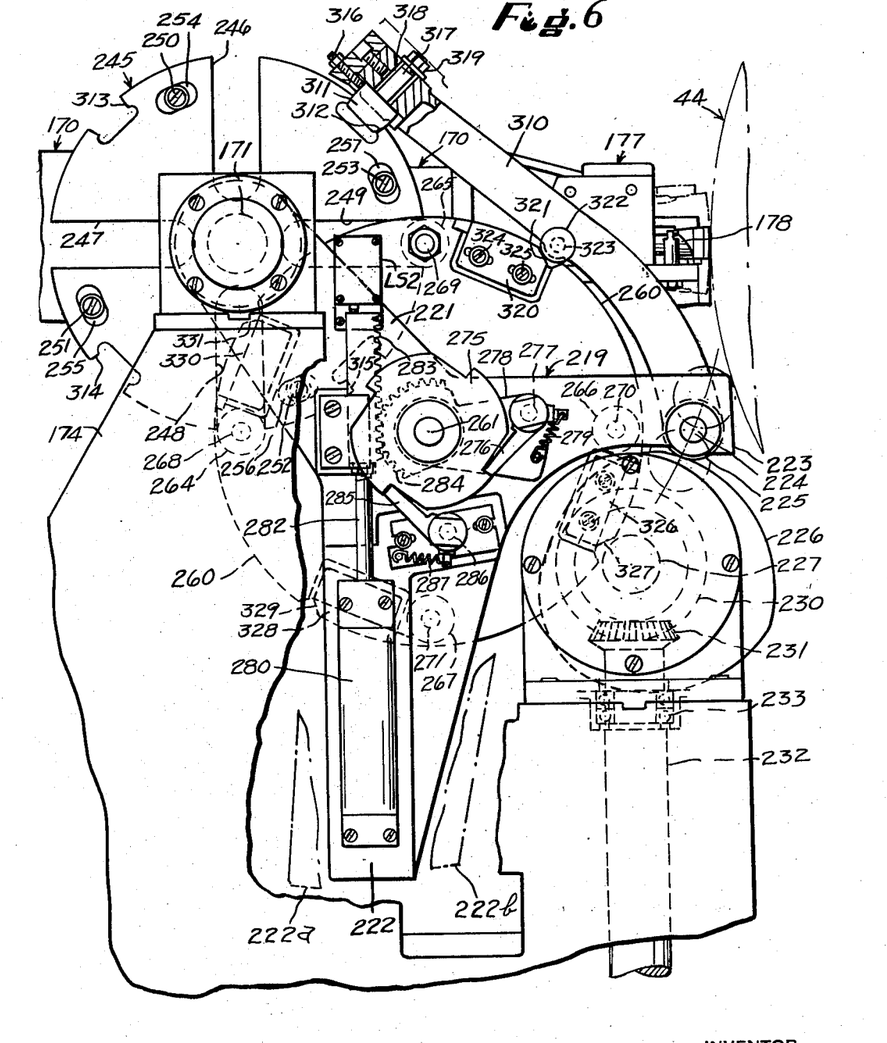
Fig. 6 is a right hand end elevation of the mechanisms as shown in Fig. 5.
Figure 7:
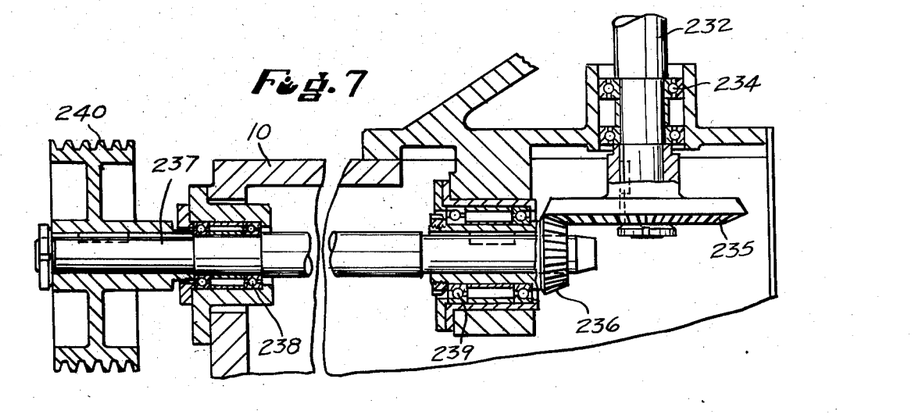
Fig. 7 is a fragmentary vertical sectional view, on an enlarged scale, taken approximately on the line 7—7 of Fig. 1, of a portion of the driving mechanism for oscillating the work support.

The arm 223 is provided with a stud 224 which supports a follower roller 225 (Fig. 6) which rides on the periphery of a rotatable cam 226. The cam 226 is mounted on a rotatable shaft 227 which is journaled in anti-friction bearings 228 and 229. The shaft 227 is provided with a bevel gear 230 which meshes with a bevel gear 231 mounted on the upper end of a vertical rotatable shaft 232. The shaft 232 is journaled in spaced anti-friction bearings 233 (Fig. 6) and 234 (Fig. 7). The lower end of the shaft 232 is provided with a bevel gear 235 (Fig. 7) which meshes with a bevel gear 236. The bevel gear 236 is mounted on the right hand end of a rotatable drive shaft 237 which is journaled in spaced anti-friction bearings 238 and 239. The left hand end of the shaft 237 is provided with a multiple V-groove pulley 240 which is connected by multiple V-belts 241 with a multiple V-groove pulley 242 which is mounted on the motor shaft 243 of an electric motor 244. It will be readily apparent from the foregoing disclosure that when the motor 244 is started, a rotary motion will be imparted through the mechanism above described to rotate the cam 226 so as to oscillate the 3-legged arm 219 to impart an oscillating motion to the work supporting member 170 thereby oscillating the work pieces being ground through a predetermined stroke relative to the grinding wheels.

The 3-legged arm 219, comprising integral radially extending arms 221, 222, and 223 (Fig. 6), serves as a support for an indexing mechanism to facilitate successively indexing the work supporting member 170 through 90 degrees (90°). This mechanism comprises a Geneva plate 245 which is adjustably supported on the work supporting member 170. The Geneva plate 245 is provided with radially extending slots 246, 247, 248, and 249 which are spaced 90° apart. A plurality of clamping screws 250, 251, 252, and 253 (Fig. 6) pass through an elongated slot 254, 255, 256 and 257 respectively formed in the Geneva plate 245 and are screw threaded into the work supporting member 170. It will be readily apparent from the foregoing disclosure that a slight rotary adjustment of the Geneva plate 245 relative to the work supporting member 170 may be obtained by loosening the screws 250, 251, 252, and 253 after which the Geneva plate 245 may be rotarily adjusted relative to the work supporting member 170. The clamping screws are then tightened to clamp the Geneva plate 245 in adjusted position.

The 3-legged arm 219 is provided with a rotatable plate 260 which is mounted on the left hand end of a rotatable shaft 261 (Fig. 5). The shaft 261 is journaled in spaced antibearings 262 and 263. The plate 260 is provided with a plurality of symmetrically arranged rollers 264, 265, 266, and 267 which are supported on studs 268, 269, 270, and 271 respectively. The rollers are spaced 90 degrees apart and are arranged when the plate 260 is rotated successively to engage the radial slots 246, 247, 248, and 249 in the Geneva plate 245 so as to impart an indexing movement to the shaft 171 and the work supporting member 170.

A ratchet wheel 275 is fixedly mounted on the right hand end of the shaft 261 (Fig. 5). An index pawl 276 is supported by a stud 277 mounted on an oscillatable arm 278 which is supported by the shaft 261. A tension spring 279 is provided normally to maintain the index pawl 276 in operative engagement with the teeth of the ratchet wheel 275.

A hydraulically operated mechanism is provided for actuating the index pawl 276. This mechanism comprises a cylinder 280 which is fixedly mounted on the vertical arm 222 (Fig. 6). The cylinder 280 contains a slidably mounted piston 281 which is connected to the lower end of a piston rod 282 (Fig. 12). A rack-bar 283 is fixedly mounted on the upper end of a piston rod 282 and meshes with a gear segment 284 formed integral with the pawl carrying arm 278. A safety pawl 285 is pivotally supported by a stud 286 which is fixed relative to the base of the machine. A tension spring 287 is provided for maintaining the safety pawl 285 in operative engagement with the ratchet wheel 275 (Fig. 12). The safety pawl 285 serves to hold the ratchet wheel 275 against rotary motion in a counter clockwise direction during the resetting motion of the index pawl 276, that is, during the downward movement of the piston 281 after an indexing movement has been completed.

A control valve 290 is provided for controlling the admission to and exhaust of fluid from the cylinder 280. The valve 290 is a piston type valve comprising a slidably mounted valve member 291 which is provided with a plurality of integral spaced valve pistons forming a plurality of valve chambers 292, 293, and 294. The valve member 291 is provided with a central passage 295 which connects the valve chamber 292 with the valve chamber 294. A compression spring 296 is provided normally to hold the valve member 291 in a left hand end position (Fig. 12). A solenoid S3 is provided which when energized serves to shift the valve member 291 into a right hand end position.

In the position of the valve 290 (Fig. 12) fluid under pressure from the pipe 103 enters the valve chamber 293 and passes through a pipe 297, through a ball check valve 298 and a throttle valve 299, through a pipe 300 into a cylinder chamber 301 so as to cause a downward movement of the piston 281 to reset the index pawl 276. During this movement, fluid within the cylinder chamber 302 exhausts through a pipe 303 into the valve chamber 294, through the central passage 295 into the valve chamber 292 and exhausts through a pipe 304 into the reservoir 102.

A pawl arm 310 (Fig. 6) is supported to rock on the stud 224. The pawl arm 310 is provided with an adjustable pawl 311 which is arranged to successively engage a plurality of notches 312, 313, 314 and 315 formed in the periphery of the Geneva plate 245 to hold the plate 245 and the work supporting member 170 in an indexed position. An adjusting screw 316 is provided to facilitate adjusting the position of the pawl 311 longitudinally relative to the pawl arm 310 to facilitate setting up the machine. The pawl 311 is supported by an integral stud 317 which passes through an elongated slot 318 formed in the pawl arm 310. The stud 317 is provided with a lock nut 319 to facilitate clamping the pawl 311 in adjusted position.

To facilitate rocking the pawl arm 310 to disengage the pawl 311 from the notches 312, 313, 314, and 315 the plate 260 is provided with a plurality of adjustably mounted cam plates 320, 326, 328, and 330 which are provided with cams 321, 327, 329, and 331 respectively. The cam plates are adjustably fastened to the plate 260 by a pair of clamping screws 324 and 325 which pass through an elongated slot in the cam plates 320, 326, 328, and 330 and are screw threaded into the plate 260. By loosening the clamping screws 324 and 325, the cam plates 320, 326, 328 and 330 may be adjusted relative to the plate 260 to facilitate a slight adjustment of the cams 321, 327, 329, and 331 so as to vary the timing of the disengagement of the pawl 311 from the notches in the Geneva plate 245.

When an indexing movement is initiated by an upward movement of the piston 281, a rotary motion is imparted to the plate 260 so that the roller 264 slides into the slot 248 and the roller 265 moves out of engagement with the notch 249. Before the roller 264 imparts rotary motion to the Geneva plate 245, the cam 321 moving in a clockwise direction in engagement with the roller 322, rocks the pawl arm 310 in a clockwise direction to disengage the pawl 311 from the notch 312. Continued rotary motion of the plate 260 causes the roller 264 to slide within the slot 248 and impart a 90 degree rotary indexing movement to the Geneva plate 245. This indexing movement continues until the next roller 267 on the plate 260 moves into engagement with the slot 247 and the pawl 311 moves into engagement with the notch 313 thereby locking the Geneva plate 245 together with the work supporting member 170 in an indexing position to facilitate removal of the ground work piece 178 therefrom.

The oscillating motion of the work supporting member 170 is provided, as above described, by a rotary motion of the cam 226 through the roller 225 to oscillate the 3-legged arm 219. The oscillating motion of the 3-legged arm 219 is transmitted through the pawl arm 310, through the pawl 311 to oscillate the geneva plate 245 together with the work supporting member 170 so as to produce a swinging or oscillating movement of the work piece relative to the grinding wheel during the infeeding movement thereof.

Operation

The operation of the improved grinding machine is as follows; work pieces, such as, jet motor blades 178 to be ground are loaded into the work holders 177 before inserting in the machine. The machine is stopped with the work supporting member 170 in a vertical or loading position as illustrated diametrically in Fig. 13. A loaded work holder 177 is mounted in the upwardly extending arm of the work supporting member 170 in a manner hereinabove described. The switch SW1 is closed to start the grinding wheel driving motors 45, 45a and 45b. The switch SW2 is closed to start the motor 100a (Fig. 1) to start the fluid pump 100.

When it is desired to start a grinding cycle, the cycle start switch PB1 is closed momentarily to close a circuit so as to energize a relay switch CR1. The closing of contacts "a" of relay switch CR1 closes a circuit to energize the solenoid S3 to shift the valve 290 into a right hand end position so as to pass fluid through the pipe 303 into the cylinder chamber 302 to cause an upward movement of the piston 281 to actuate the indexing mechanism above described to index the work supporting member 170 through 90° in a clockwise direction into a horizontal position 170a (Fig. 13). The closing of contacts "b" of relay switch CR1 sets up a holding circuit through the normally closed contacts "a" of the time relay switch TD1, through the normally closed contacts "a" of the limit switch LS2 to maintain the relay switch CR1 and the solenoid S3 energized.

The limit switch LS2 is fixedly mounted on the 3-legged arm 219 and is actuated by the vertical movement of the rack bar 283 (Fig. 6 and 12). When the rack bar moves upwardly and actuates the limit switch LS2, the normally closed contacts "a" of limit switch LS2 open to break the holding circuit to deenergize the relay switch CR1 and also to deenergize the solenoid S3 so that the released compression of the spring 296 returns the valve member 291 into a left hand end position. In this position of the valve 290, fluid under pressure is passed through the pipe 297, through the ball check valve 298 and the throttle valve 299 through the pipe 300 into the cylinder chamber 301 to cause a downward movement of the piston 291 thereby resetting the index mechanism above described so that it is ready for the next cycle of operation. The closing of the normally open contacts "b" of limit switch LS2 serves to energize an electric timer T1 closing contacts LC1, RC1, and CC1. The closing of the contacts LC1 sets up a holding circuit to maintain the timer T1 energized. The closing of contacts RC1 serves to energize the relay switch CR2 to open the normally closed contacts "a" thereby releasing a built-in brake in the work oscillation motor 244. The closing of the normally open contacts "b" of relay switch CR2 closes a circuit to start the motor 244 to impart a rotary motion to the cam 226 to impart an oscillation motion to the work supporting member 170 to oscillate the work piece 178 being ground relative to the operative faces of the grinding wheel.

The closing of contacts CC1 of the timer T1 closes a circuit to energize the solenoid S1 to shift the valve 106 into a left hand end position so that fluid under pressure is passed through the pipe 88 to initiate a rapid approaching movement of the wheel slides 40, 40a and 40b to position the grinding wheels 44, 44a, and 44b, respectively, into operative position relative to the faces of the work to be ground. At the same time fluid under pressure passing through the pipe 88 starts the piston 126 moving toward the right to impart a rotary motion to the feed screw 55 to initiate a grinding feed. At the same time fluid under pressure in the pipe 88 passes into the left hand end chamber 135 of the backlash valve 136 to move the valve member 137 toward the right at a rate controlled by the throttle valve 140. As above described the movement of the valve chamber 138 across the port 141 allows fluid to exhaust from the cylinder chamber 132 at a rapid substantially unrestricted rate so as to take up backlash in the parts of the feeding mechanism. As soon as the backlash vlave 136 has completed its stroke toward the right, fluid exhausting from the cylinder chamber 132 passes through the throttle valve 134 and also through the throttle valve 144 which together serve to control the initial rate of the grinding feed. During this movement the feed wheel 65 rotates in a counter clockwise direction. As the work piece approaches a predetermined size, the cam 80 engages cam 81 on the feed pawl 76 (Fig. 12) and rocks the feed pawl 76 together with the arm 145 in a counter clockwise direction thereby shifting the valve member 148 toward the right to close off the exhaust of fluid through the throttle valve 134 so that the rate of infeed is reduced to a finished grinding rate as controlledl by the throttle valve 144.

As previously described, when the arm 145 swings in a counter clockwise direction, the valve member 148 moves only a short distance so that fluid under pressure from the pressure pipe 103 may enter the valve chamber 151 and pass through the passage 160 into the chamber 161 so as to move the valve member 152 rapidly toward the right to cut off the initial exhaust of fluid from the throttle valve 134 and the pipe 157.

The piston 126 continues its movement toward the right at a rate controlled by the throttle valve 144. This movement continues until the stop abutment 79 carried by the feed wheel 65 engages the stop surface 78 on the upper end of the feed pawl 76 positively to stop the infeeding movement of the grinding wheel. The grinding wheel remains in a grinding contact of the material to finish grinding the work piece until the timer T1 times out. When the timer T1 times out contact LC1, RC1, and CC1 of the timer T1 open. The opening of contacts LC1 breaks the holding circuit to deenergize the timer T1 and to reset the timer T1 for the next cycle of operation. The opening of contacts CC1 serves to deenergize the solenoid S1 so that the released compression of the spring 115 returns the valve 106 to the position illustrated in Fig. 12 thereby moving the grinding wheel slides 40, 40a and 40b rearwardly to an inoperative position and at the same time resetting the piston 126 into a left hand end position. This shifting of the valve 106 also resets the back lash valve 136 for the next cycle of operation. The resetting of piston 126, that is, movement toward the left serves to rotate the feed wheel 65 in a clockwise direction so as to reset it for the next grinding cycle. As the cam 80 moves away from the engagement with the cam 81, the release compression of the spring 156 in the valve 147 resets the valve 147 into the position illustrated in Fig. 12 so that it is ready for the next infeeding of the cycle.

The opening of contacts RC1 of the timer T1 serves to deenergize the relay switch CR2 so that the normally open contacts "b" open to stop the motor of the oscillation motor 244 and at the same time the normally closed contacts "a" of the relay switch CR2 close to energize the built-in brake to rapidly stop the motor 244.

During the rearward movement of the wheel slide 40, an adjustable dog 355 which moves with the wheel slide momentarily closes a limit switch LS3 to energize a time delay relay TD1 to immediately close contacts "b" and to open contacts "a." The closing of contacts "b" of time delay relay TD1 serves to energize the solenoid S3 to cause an upward movement of the piston 281 thereby indexing the work supporting member 170 through 90° into a vertical or loaded position, as shown in Fig. 13. The opening of contacts "a" of time delay relay TD1 opens a circuit so that even though the contacts "b" of limit switch LS2 close by upward movement of the rack bar 283, the timer T1 will not be energized. After a predetermined timed interval, the timed delay relay TD1 deenergizes. The opening of the contacts "b" of relay TD1 serves to deenergize the solenoid S3 thereby returning the valve 290 to the position illustrated in Fig. 12 so that fluid under pressure is passed into the cylinder chamber 301 to cause a downward movement of the piston 281 thereby resetting the indexing mechanism ready for the next cycle of operation. The work holder 177 supporting the ground work piece may then be removed from the upwardly extending arm of the work supporting member 170 after which a holder 177 with a piece of work to be ground may be inserted there instead. It will be readily apparent from the foregoing disclosure that after the initial loading operation, the internal surfaces on the work piece are ground simultaneously with the external work pieces on another work piece.

It will thus be seen that there has been provided by this invention apparatus in which the various objects hereinabove set forth together with many thoroughly practical advantages are successfully achieved. As many possible embodiments may be made of the above invention and as many changes might be made in the embodiment set forth, it is to be understood that all matter hereinbefore set forth or shown in the accompanying drawings is to be interpreted as illustrative and not in a limiting sense.

I claim:

1. In a grinding machine having a base, a transversely movable rotatable grinding wheel on said base, means to move said wheel transversely in a direction normal to its axis of rotation, a rotatable work support, means precisely to locate a work piece radially on said work support, an indexing mechanism to index said work support to facilitate loading work pieces thereon, and means including a motor driven rotatable cam to oscillate said work support to facilitate grinding a partial cylindrical surface on the end portion of said work piece.

2. In a grinding machine having a base, a transversely movable rotatable grinding wheel on said base, means including an indexable work support on said base, means precisely to locate a work piece radially on said work support, an indexing mechanism to index said work support to facilitate loading work pieces thereon, means including a rotatable cam and a follower to oscillate said work support, means including a motor operatively connected to actuate said cam to facilitate grinding a partial cylindrical surface on the end portion of said work piece, means to feed said grinding wheel transversely in a direction normal to the wheel axis, and means actuated by movement of the grinding wheel to an inoperative position to actuate said indexing mechanism to index the work support to a loading position.

3. In a grinding machine having a base, a transversely movable rotatable grinding wheel on said base, a rotatable work turret, a plurality of radially extending arms on said turret, means precisely to locate a work piece thereon, means including a Geneva-type indexing mechanism to facilitate indexing said work turret from a loading to a grinding position, means including a rotatable cam and a follower to impart an oscillating movement to said work support, and means including a motor operatively connected to actuate said cam to facilitate grinding a partial cylindrical surface on the end portion of a work piece.

4. In a grinding machine having a base, a transversely movable rotatable grinding wheel on said base, means to move said wheel transversely in a direction normal to its axis of rotation, a rotatable work turret, a plurality of radially extending arms on said turret, means precisely to locate a work piece on the ends of said arms, means to index said work turret to facilitate loading work pieces thereon, a rotatable cam and a follower to impart an oscillating movement to said work turret to facilitate grinding a partial cylindrical surface on the end of a work piece, and means including a motor operatively connected to rotate said cam.

5. In a grinding machine having a base, a pair of spaced transversely movable rotatable grinding wheels on said base, a rotatable work support having diametrically extending arms, means precisely to locate a work piece to be ground on opposite ends of said arms, means to index said work support to facilitate loading work pieces on said arms, one of said grinding wheels being shaped to grind external partial cylindrical surfaces on a work piece supported on one of said arms and the other of said grinding wheels being shaped to grind internal partial cylindrical surfaces on another work piece supported on the other of said arms, means simultaneously to feed said grinding wheels, transversely toward and from the surfaces to be ground in a direction normal to the wheel axis, means including a rotatable cam and a follower to oscillate said work support to facilitate simultaneously grinding external and internal partial cylindrical surfaces on a pair of work pieces respectively, and means including an electric motor operatively connected to rotate said cam.

6. In a grinding machine having a base, a pair of spaced transversely movable rotatable grinding wheels thereon, means to move said wheel transversely in a direction normal to its axis of rotation, an indexable work support having diametrically opposed work supporting arms, means including a rotatable cam to oscillate said work support, means including a fluid motor to feed said grinding wheels transversely, a solenoid-actuated control valve therefor, a fluid motor actuated indexing mechanism for said work support, a solenoid-actuated control valve therefor, a cycle start switch operatively connected to operate said latter valve to index said work support, means including an electric motor operatively connected to rotate said cam to oscillate the work support, an electric timer, and means including a limit switch actuated by and in timed relation with said indexing mechanism to energize said timer, said timer serving when energized to start said electric motor and to energize said first solenoid valve to initiate an infeeding movement of said grinding wheel and to impart an oscillating movement to the work support.

7. In a grinding machine, as claimed in claim 5, in combination with the parts and features therein specified of means including a fluid motor to feed said grinding wheels transversely, a solenoid-actuated control valve therefor, a fluid motor to actuate said indexing mechanism, a solenoid-actuated control valve therefor, a cycle start switch operatively connected to operate said latter valve to index said work support, means including an electric motor operatively connected to rotate said cam to oscillate the work support, an electric timer, means including a limit switch actuated by and in timed relation with said indexing mechanism to energize said timer, contacts in said timer operatively connected when the timer is energized to energize first solenoid valve to initiate an infeeding movement of the grinding wheel and to start said electric motor to impart an oscillating movement to the said work support, said timer serving after a predetermined time interval to deenergize said first solenoid valve to move the grinding wheel to an inoperative position and to stop the oscillation of the work support after a predetermined grinding operation has been completed.

8. In a grinding machine, as claimed in claim 5, in combination with the parts and features therein specified of a limit switch operatively connected to initiate an indexing movement of the work support, a means including an adjustable dog to actuate said limit switch during movement of the grinding wheel to an inoperative position after a grinding operation has been completed to initiate an indexing movement of the work support to a loading position.

9. In a grinding machine having a base, a transversely movable rotatable grinding wheel on said base, means to feed said wheel transversely in either direction in a direction normal to the wheel axis, a rotatable shaft on said base, a rotatable work support thereon, means including a detachable work holder precisely to locate a work piece on said support, means including an indexing mechanism to index said work support from a loading to a grinding position, a rotatable cam and a follower to impart an oscillating movement to said work support to facilitate grinding a partial cylindrical surface adjacent to the end of a work piece, a motor operatively connected to rotate said cam, and means actuated by and in timed relation with said indexing mechanism simultaneously to initiate an infeeding movement of the grinding wheel and to initiate an oscillating movement of the work support.

10. In a grinding machine as claimed in claim 9, in combination with the parts and features therein specified in which the indexing mechanism comprises an index plate on said shaft having symmetrically arranged peripheral notches, an arm oscillatably supported on said shaft, means including a pawl and ratchet mechanism on said arm to index said mechanism, a motor on said arm to actuate said pawl and ratchet mechanism, operative connections between the pawl and ratchet mechanism and the index plate to index said work support, a pivotally mounted pawl on said arm engageable with successive notches in said index plate to facilitate holding said plate and work support in an indexed position, and means including a rotatable cam and follower actuated by said motor so as to oscillate said arm so as to impart an oscillating motion to said work support and said work piece during a grinding operation.

11. In a grinding machine having a base, a plurality of spaced transversely movable rotatable grinding wheels on said base, means to move said wheel transversely in a direction normal to its axis of rotation, a rotatable work support having diametrically extending arms, means precisely to locate a work piece to be ground on the opposite ends of said arms, means to index said work support to facilitate loading work pieces on said arms, at least one of said grinding wheels being shaped to grind external partial cylindrical surfaces on a work piece supported on one of said arms and at least one of said grinding wheels being shaped to grind internal partial cylindrical surfaces on another work piece supported on the other of said arms, means simultaneously to feed said grinding wheels transversely toward and from the surfaces to be ground, means including a rotatable cam and a follower to oscillate said work support to facilitate simultaneously grinding external and internal partial cylindrical surfaces on a pair of work pieces respectively, and means including a motor operatively connected to rotate said cam.

References Cited in the file of this patent

UNITED STATES PATENTS

| | | |
|---|---|---|
| 1,361,883 | Littman | Dec. 14, 1920 |
| 1,450,853 | Hawes | Apr. 3, 1923 |
| 2,618,909 | Hill | Nov. 25, 1952 |